(12) United States Patent
Nakao et al.

(10) Patent No.: US 7,428,198 B2
(45) Date of Patent: Sep. 23, 2008

(54) OPTICAL DISC DEVICE

(75) Inventors: Kenji Nakao, Gifu (JP); Noboru Mamiya, Mizuho (JP); Ken Hirose, Gifu (JP); Satoshi Sumi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 769 days.

(21) Appl. No.: 11/075,763

(22) Filed: Mar. 10, 2005

(65) Prior Publication Data

US 2005/0213451 A1   Sep. 29, 2005

(30) Foreign Application Priority Data

Mar. 25, 2004   (JP)   ............................ 2004-089291

(51) Int. Cl.
*G11B 7/00* (2006.01)
(52) U.S. Cl. ................. 369/47.53; 369/47.3; 369/59.11
(58) Field of Classification Search ............... 369/47.53
See application file for complete search history.

(56) References Cited

U.S. PATENT DOCUMENTS

| | | | | |
|---|---|---|---|---|
| 2002/0044507 A1* | 4/2002 | Hagiwara et al. | .......... | 369/47.4 |
| 2002/0085470 A1* | 7/2002 | Yokoi | ....................... | 369/59.11 |
| 2003/0031102 A1* | 2/2003 | Narumi et al. | ............. | 369/47.3 |
| 2003/0086346 A1* | 5/2003 | Fukumoto | ................ | 369/47.53 |
| 2005/0213452 A1* | 9/2005 | Hirose et al. | ............. | 369/47.53 |

OTHER PUBLICATIONS

Triceps Corporation publication, "White Series No. 218 DVD+RW/R",(4.2 OPC (Optimum Write Power Control) ) method Jan. 22, 2002, pp. 111-113 (3 pages of English Translation).
Chinese Office Action issued in Corresponding Chinese Patent Application No. 200510059479.7, dated on May 19, 2007.

* cited by examiner

*Primary Examiner*—Wayne Young
*Assistant Examiner*—Van T Pham
(74) *Attorney, Agent, or Firm*—McDermott Will & Emery LLP

(57) ABSTRACT

Provided is an optical disc device in which adjustment precision of recording laser power is improved without complication of a processing sequence during recording operation. In response to a recording start instruction, OPC is executed using an inner disc drive zone to set an initial value of recording laser power Pws. Then, when a first recording instruction REC(1) is detected, recording is successively performed from the head of a data area using the laser power Pws. After that, when an intermittent standby period is set, sample data is recorded to a next recording position and R-OPC is executed. Therefore, the recording laser power Pws is set again. Next, when a second recording instruction REC(2) is detected, recording is successively performed from a next recording position, that is, a position next to an end portion of the first recording instruction REC(1) using the reset laser power Pws. At this time, data corresponding to a head portion of the second recording instruction REC(2) is overwritten on sample data in the head of the recording position.

17 Claims, 14 Drawing Sheets

FIG. 7

| Pw(mW) | m(%) | Pw*m | Pw^2*m |
|---|---|---|---|
| 16.06718 | 42.68 | 685.7474 | 11018.03 |
| 16.51851 | 46.01 | 760.0166 | 12554.34 |
| 16.96983 | 50.9 | 863.7645 | 14657.94 |
| 17.42116 | 52.76 | 919.1403 | 16012.49 |
| 17.87248 | 55.9 | 999.0719 | 17855.9 |
| 18.32381 | 58.75 | 1076.524 | 19726.02 |
| 18.77513 | 61.21 | 1149.226 | 21576.87 |
| 19.22646 | 63.41 | 1219.15 | 23439.94 |
| 19.67779 | 66.26 | 1303.85 | 25656.88 |
| 20.12911 | 67.48 | 1358.312 | 27341.62 |
| 20.58044 | 69.87 | 1437.955 | 29593.74 |
| 21.03176 | 70.3 | 1478.533 | 31096.15 |
| 21.48309 | 71.68 | 1539.908 | 33081.97 |
| 21.93441 | 72.72 | 1595.07 | 34986.93 |
| 22.38574 | 73.33 | 1641.546 | 36747.22 |
| 22.83706 | 74.09 | 1691.998 | 38640.27 |
| 23.28839 | 74.69 | 1739.41 | 40508.05 |

| Pw(mW) | m(%) | Pw*m | Pw^2*m |
|---|---|---|---|
| 11.34518 | 42.85 | 486.1411 | 5515.361 |
| 11.81015 | 49.05 | 579.2879 | 6841.477 |
| 12.27512 | 54.71 | 671.5717 | 8243.621 |
| 12.74008 | 59.49 | 757.9076 | 9655.806 |
| 13.20505 | 62.65 | 827.2964 | 10924.49 |
| 13.67002 | 65.6 | 896.7531 | 12258.63 |
| 14.13498 | 68.58 | 969.3772 | 13702.13 |
| 14.59995 | 70.96 | 1036.012 | 15125.73 |
| 15.06492 | 73.2 | 1102.752 | 16612.86 |
| 15.52988 | 75.16 | 1167.226 | 18126.88 |
| 15.99485 | 76.66 | 1226.165 | 19612.33 |
| 16.45982 | 77.7 | 1278.928 | 21050.91 |
| 16.92478 | 78.91 | 1335.535 | 22603.63 |
| 17.38975 | 80.27 | 1395.875 | 24273.92 |
| 17.85472 | 80.82 | 1443.018 | 25764.68 |
| 18.31968 | 81.37 | 1490.673 | 27308.65 |
| 18.78465 | 82.63 | 1552.176 | 29157.07 |

*FIG. 11*

OPTICAL DISC DEVICE

BACKGROUND OF THE INVENTION

1. Field of the Invention

The present invention relates to an optical disc device for recording and/or reproducing information by using laser beams, which is particularly suitable for adjusting a set value of laser power.

2. Description of the Related Art

Recently, various optical recording media such as a compact disc (CD) and a digital versatile disc (DVD) have been commercialized and are widely available. With respect to the optical recording media, in general, laser power is optimized on a system side before recording/reproducing operations because optimum laser power is changed according to a medium.

Of the optical recording media, with respect to a CD-RW (rewritable) and a DVD-RW (rewritable), a recording laser power adjusting method ($\gamma$ method) using a $\gamma$ value is described in each corresponding standard specification. According to the adjusting method, recording laser power is set to an optimum value based on a modulation factor of a reflection light intensity detected in trial writing and a target $\gamma$ value set in advance for a corresponding medium.

With respect to a DVD+RW, the use of $\gamma$ methods, particularly, a linear fit method out of the methods is recommended in its specification. According to the linear fit method, product values Sn (=m(Pwn)×Pwn) are calculated based on several kinds of recording laser powers Pwn set in trail writing and modulation factors m(Pwn) of reflection light intensities detected in trial writing at the respective recording laser powers Pwn. And a relationship characteristic between the calculated product values Sn and the recording laser powers Pwn is subjected to linear approximation to obtain laser power Pwth when an approximate line (Sn) becomes zero. Then, optimum laser power Pw (=Pwth×(1+1/$\gamma$)) is calculated based on the obtained laser power Pwth and a target $\gamma$ value ($\gamma$) for the medium.

A laser power setting method based on the $\gamma$ method or the linear fit method is described in, for example, Jan. 22, 2002, Triceps Corporation publication, "White Series No. 218 DVD+RW/R", pp. 111-113 (4.2 OPC (Optimum Write Power Control) method).

When a system state (medium temperature, semiconductor laser temperature etc.) changes after the setting of the recording laser power as described above, for example, the recording sensitivity of the medium is changed from an initial state. With this change, the recording laser power initially set is gradually deviated from an adequate value. In order to solve such a problem, on the system side, the initially set recording laser power is generally adjusted as appropriate according to a current system state.

For example, as the adjusting method, it is possible to use a method of monitoring a reflection light intensity during recording operation (reflection light intensity from formed recording mark) based on a signal level from a photo detector (optical pickup) and adjusting recording laser power such that the monitored reflection light intensity becomes an initially set reflection light intensity. However, in this case, it is necessary to separately perform power adjustment processing in parallel with the recording operation. Therefore, a problem in that a processing sequence during the recording operation is complicated occurs. In addition, the adjustment processing is not processing for monitoring a modulation factor of disc reflection light. Therefore, a formation state of the recording mark cannot be accurately detected, with the result that the method is disadvantageous in that the recording laser power cannot be adjusted with high precision.

SUMMARY OF THE INVENTION

An object of the present invention is to provide an optical disc device capable of improving adjustment precision of recording laser power without complication of a processing sequence during recording operation.

One aspect of the present invention relates to an optical disc device for recording and reproducing information on and from a rewritable disc, including:

sample data recording means for recording sample data using recording laser power different from current laser power during an intermittent standby period other than a recording operational period;

sample data reproducing means for reproducing the sample data recorded by the sample data recording means during the intermittent standby period;

recorded data reproducing means for reproducing data recorded by recording operation performed before the intermittent standby period, during the intermittent standby period; and power correcting means for obtaining a current recording characteristic from a reproduction signal reproduced by the sample data reproducing means and a reproduction signal reproduced by the recorded data reproducing means and correcting the recording laser power based on the obtained current recording characteristic.

In the optical disc device, the sample data recording means may record the sample data using laser power obtained by reducing the current laser power by a predetermined factor.

Further, in the optical disc device, the sample data recording means may record the sample data in a next recording position after a lapse of the intermittent standby period. At this time, data recorded after a lapse of the intermittent standby period is overwritten on the sample data from a next recording position after the lapse of the intermittent standby period.

Further, in the optical disc device, the recorded data reproducing means may reproduce data in a data block which is recorded immediately before the intermittent standby period.

Further, the recorded data reproducing means may reproduce a predetermined amount of data from an end portion of the data block which is recorded immediately before the intermittent standby period.

Further, in the optical disc device, the power correcting means may obtain an approximate characteristic specifying a relationship between a predetermined parameter related to a recording characteristic and recording laser power from the reproduction signal reproduced by the sample data reproducing means and the reproduction signal reproduced by the recorded data reproducing means and reset the recording laser power based on the obtained approximate characteristic.

Here, the predetermined parameter may comprise a product of a modulation factor of a reproduction signal and recording laser power, and in this case, the power correcting means may obtain an approximate characteristic specifying a relationship between the product and recording laser power and reset the recording laser power based on the obtained approximate characteristic and a $\gamma$ value required for the rewritable disc.

Further, in the optical disc device, the predetermined parameter may comprise a product of a modulation factor of a reproduction signal and a square of recording laser power, and in this case, the power correcting means may obtain an approximate characteristic specifying a relationship between the product and recording laser power and resetting the recording laser power based on the obtained approximate characteristic and a γ value required for the rewritable disc.

Note that the "intermittent standby period" in the present invention indicates a period during which a system is in a recording standby state between the recording operation of a predetermined sequence and the recording operation of the next sequence shifted therefrom.

According to the present invention, the recording laser power adjusting processing is performed during the intermittent standby period other than the recording operational period. Therefore, the laser power adjusting processing is not performed particularly during the recording operation, with the result that the complication of a processing sequence in recording operation can be prevented.

The recording characteristic is derived from the reproduction signal of recording data recorded by previous recording operation, so that the number of times of sample data is written on trial during the intermittent standby period can be reduced. Therefore, even when the intermittent stand by period is a relatively short period, the laser power can be smoothly adjusted.

When the laser power for the recording of the sample data is to be set to a value obtained by reducing the current laser power by a predetermined factor, damage to a recording layer which is caused by overpower and the influence (overwriting) on an adjacent track can be suppressed. Therefore, it is possible to protect both the medium and the recorded data.

When the sample data is to be recorded in the next recording position after the lapse of the intermittent standby period, the recording laser power can be adjusted to power corresponding to a state of the next recording position. Therefore, smooth recording operation can be realized.

When the recording characteristic is to be derived by reproducing data in the data block recorded immediately before the intermittent standby period, it is possible to derive the recording characteristic from the reproduction signal obtained from a close recording position in time. Therefore, the recording laser power can be adjusted to laser power corresponding to a current system state.

When the product of the modulation factor of the reproduction signal and the square of the recording laser power is used as the predetermined parameter, an approximate characteristic specifying a relationship between the product and recording laser power is obtained, and the recording laser power is set again based on the obtained approximate characteristic and the γ value required for the rewritable disc, as is apparent from the following embodiment mode, the approximate precision of the approximate characteristic can be improved, with the result that the recording laser power can be set again with high precision while the number of times the sample data is recorded is small.

BRIEF DESCRIPTION OF THE DRAWINGS

The above and other objects and novel features of the present invention will become apparent from the following detailed description of embodiments taken in conjunction with the accompanying drawings, in which:

FIG. 7 is a table explaining a technical effect according to Embodiment 2 (Verification Result 1) of the present invention;

FIG. 11 is a table explaining a technical effect according to Embodiment 2 (Verification Result 2) of the present invention;

DETAILED DESCRIPTION OF THE PREFERRED EMBODIMENTS

Hereinafter, an embodiment mode of the present invention will be described in detail with reference to the drawings. It is to be expressly understood, however, that the following embodiment mode is for the purpose of illustration only and is not intended to limit the scope of the present invention.

Figure 1:
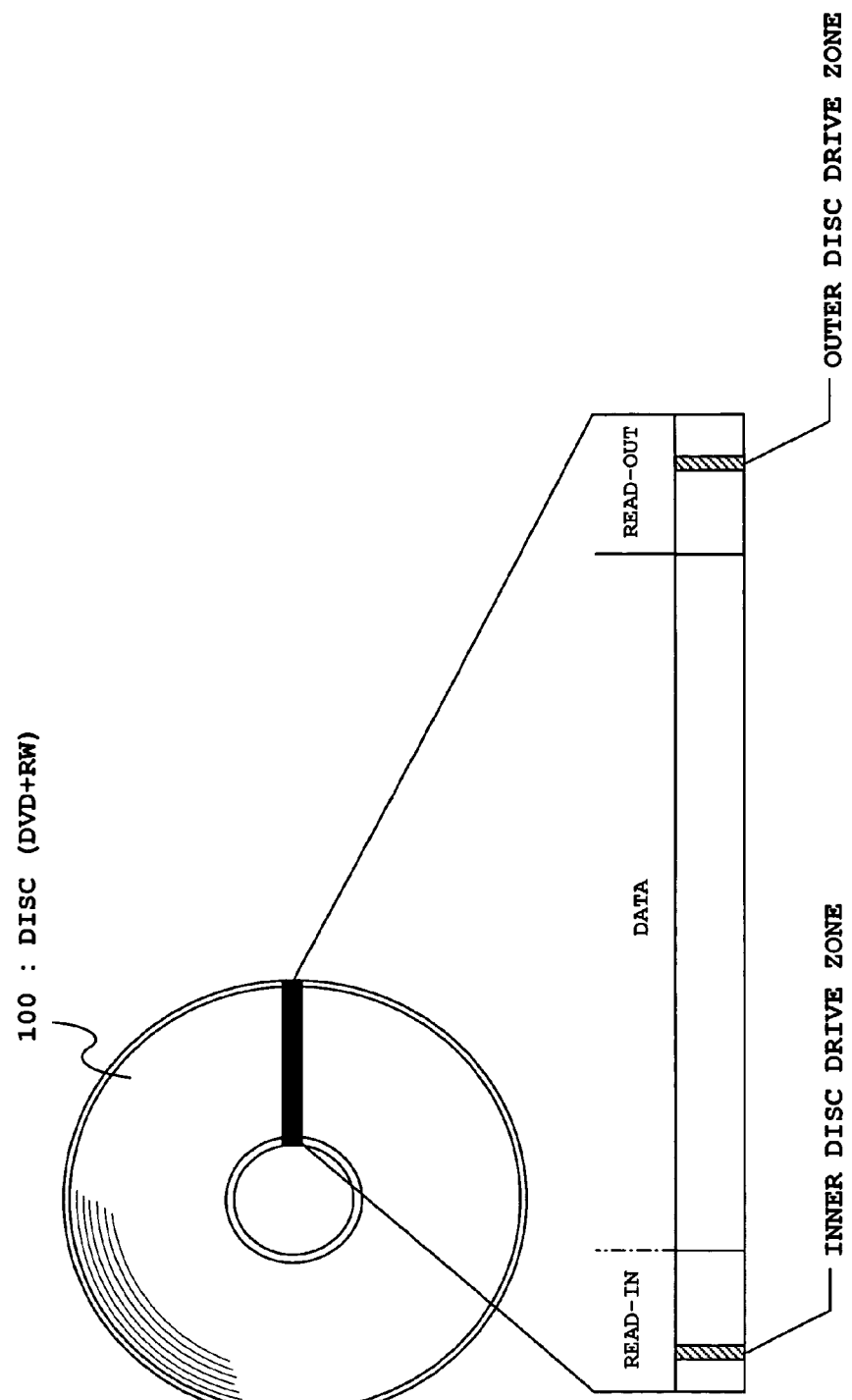
FIG. 1 shows a structure of an optical disc according to an embodiment mode of the present invention.

FIG. 1 shows a structure of a disc (DVD+R) according to an embodiment mode of the present invention. As shown in FIG. 1, a disc 100 is divided into a read-in area, a data area, and a read-out area in its radius direction. The read-in area and the read-out area each are classified into various zones. Of the various zones, an inner disc test zone and an outer disc test zone are used to perform laser power initial setting (optimum write power control (OPC)).

In the disc 100, spiral grooves are formed from the inner radial position to the outer radial position. Data is recorded in the grooves. Here, the grooves are meandered (wobbled) in the radius direction. Address information are held by the wobble. That is, a phase modulation section which is called an address in pre-groove (ADIP) is inserted into a monotonic meandering section at regular intervals. When the phase modulation section is scanned with a beam, address information on the grooves are read based on a change in intensity of reflection light and reproduced. Various control data for the disc 100 are recorded in ADIPs of the read-in area by phase modulation. The control data include the target γ value (γ target) of the disc.

Figure 2:
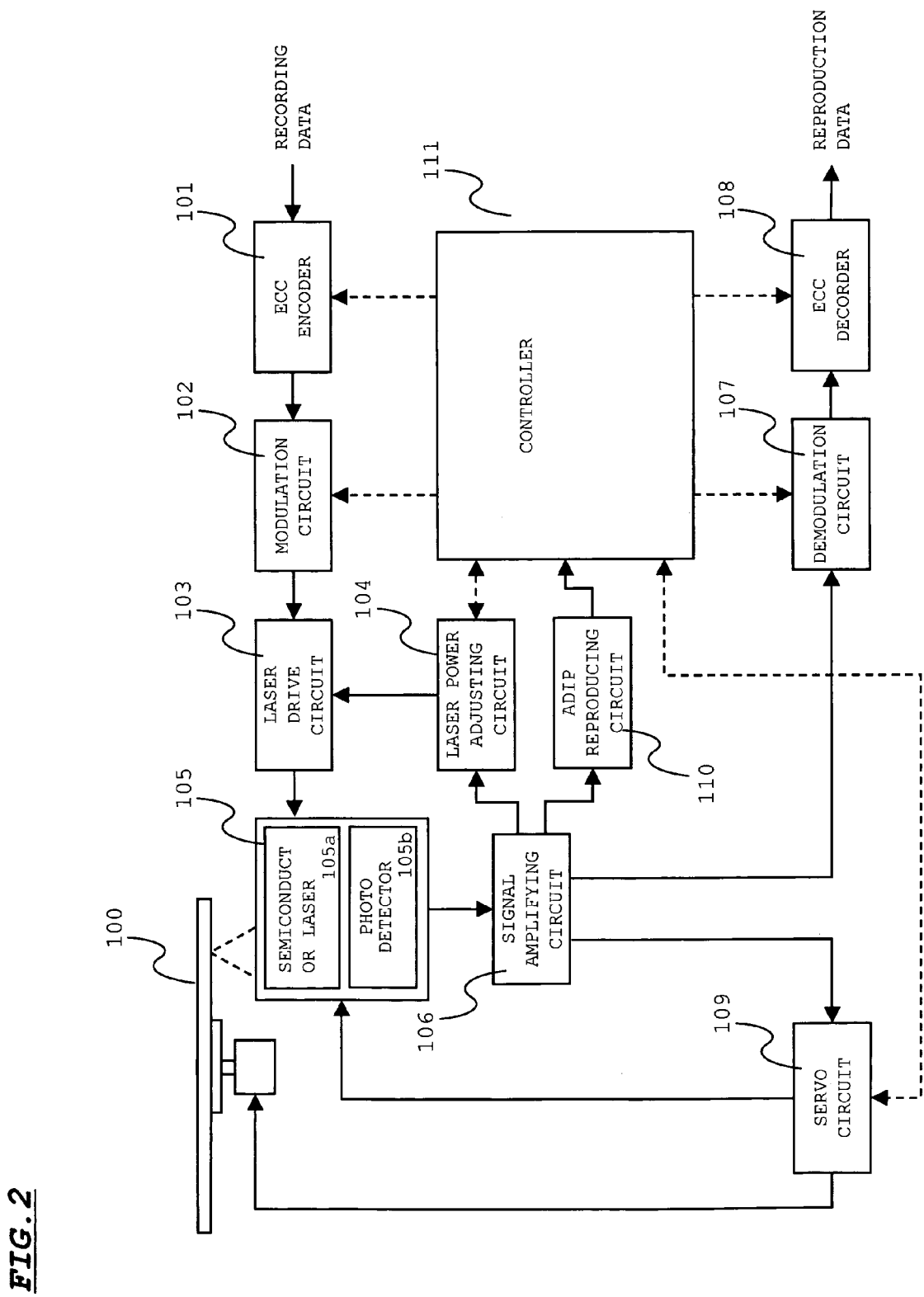
FIG. 2 shows a structure of an optical disc device according to the embodiment mode of the present invention.

FIG. 2 shows a configuration of an optical disc device according to an embodiment mode of the present invention.

As shown in the figure, the optical disc device includes an ECC encoder 101, a modulation circuit 102, a laser drive circuit 103, a laser power adjusting circuit 104, an optical pickup 105, a signal amplification circuit 106, a demodulation circuit 107, an ECC decoder 108, a servo circuit 109, an ADIP reproducing circuit 110, and a controller 111.

The ECC encoder 101 adds an error correction code to inputted recording data and outputs the resultant data to the modulation circuit 102. The modulation circuit 102 performs predetermined modulation on the inputted recording data and generates a recording signal to output it to the laser drive circuit 103. The laser drive circuit 103 outputs a drive signal corresponding to the recording signal inputted from the modulation circuit 102 to a semiconductor laser 105a at the time of recording and a drive signal for emitting a laser beam having a single intensity to the semiconductor laser 105a at the time of reproduction. The laser power is adjusted/set by the laser power adjusting circuit 104.

The laser power adjusting circuit 104 calculates a modulation factor m(Pwn) from the amplitude of a reproduction RF signal detected in trial writing and sets an initial value of recording laser power Pws based on the calculated modulation factor m(Pwn) and the target γ value (γ target) for the disc 100. The laser power adjusting circuit 104 suitably adjusts the initial set value of the recording laser power Pws according to a state of a reflection light intensity and supplies the adjusted set value of the recording laser power Pws to the laser drive circuit 103. Note that processing for setting and adjusting the recording laser power will be described later in detail.

The optical pickup 105 includes the semiconductor laser 105a and a photodetector 105b and writes and reads data to and from a disc by converging a laser beam on a groove of the disc. Note that the optical pickup 105 further includes an objective lens actuator which adjusts the converged state of the laser beam onto the groove and an optical system which guides the laser beam irradiated from the semiconductor laser 105a to an objective lens and guides light reflected by the disc 100 to the photodetector 105b.

The signal amplification circuit 106 amplifies and calculates a signal received from the photodetector 105b to generate various types of signals, and outputs the signals to corresponding circuits. The demodulation circuit 107 demodulates a reproduction RF signal inputted from the signal amplification circuit 106 to generate reproduction data and outputs the reproduction data to the ECC decoder 108. The ECC decoder 108 performs an error correction on the reproduction data inputted from the demodulation circuit 107 and outputs the resultant data to a subsequent circuit.

The servo circuit 109 generates a focus servo signal and a tracking servo signal from a focus error signal and a tracking error signal which are inputted from the signal amplification circuit 106 and outputs the focus servo signal and the tracking servo signal to the objective lens actuator of the optical pickup 105. Further, the servo circuit 109 generates a motor servo signal from a wobble signal inputted from the signal amplification circuit 106 and outputs the motor servo signal to a disc drive motor.

The ADIP reproducing circuit 110 reproduces address data and various control data based on the wobble signal inputted from the signal amplifying circuit 106 and outputs the address data and the control data to the controller 111. The controller 111 controls each part in accordance with a program stored in an embedded memory.

When the disc 100 is set in the optical disc device, various control data recorded in the ADIPs of the read-in area are read and stored in the controller 111. After that, when a recording start instruction is inputted to the optical disc device, trial writing is performed on the inner disc drive zone of the read-in area or the outer disc drive zone of the read-out area. The area on which trial writing has been performed is reproduced to set an initial value of the recording laser power Pws for recording. Recording is started using the initial set value of the recording laser power. Then, the recording laser power is adjusted during an intermittent standby period other than a recording operational period. Next recording is performed using the adjusted recording laser power.

Hereinafter, specific examples of processing for setting and adjusting the recording laser power will be described.

Embodiment 1

A method of setting the recording laser power Pws will be described with reference to FIG. 3.

It is known that a γ value for the medium (disc) satisfies the following relational expression:

$$\gamma = \{dm(Pw)/dpw\} \times \{Pw/m(Pw)\} \qquad (1)$$

where m(Pw) denotes a modulation factor when recording is performed using laser power Pw and then reproduction is performed. When a reflection light intensity from a non-recording mark area is given by P0, and a reflection light intensity from a recording mark area is given by P1, the modulation factor m(Pw) is expressed by (P0−P1)/P0.

On the other hand, the linear fit method is based on the assumption that the following relational expression is established:

$$m(Pw) \times Pw = M \times (Pw - Pwth) \qquad (2)$$

where M denotes a convergence value of the modulation factor m(Pw) when Pw=∞. In addition, Pwth denotes a value of the laser power Pw when m(Pw)×Pw=0.

When substituting the expression (2) in the expression (1), the following expression is obtained.

$$\gamma = Pwth/(Pw - Pwth) \qquad (3)$$

When the expression (3) is solved for Pw, optimum laser power Pws based on the linear fit method is obtained from the following expression:

$$Pws = Pwth \times (1 + 1/\gamma) \qquad (4)$$

As described above, trial writing is performed using several kinds of recording laser powers Pwn and then reproduction is performed. The modulation factors m(Pwn) are obtained based on respective reproduction signals. Product values Sn (=m(Pwn)×Pwn) are calculated based on the obtained modulation factors m(Pwn). A relationship characteristic between the calculated product values Sn and the recording laser powers Pwn is subjected to linear approximation. Therefore, it is apparent from the expression (2) that laser power when an approximate line (Sn) becomes zero can be obtained as Pwth. Then, when Pws (=Pwth×(1+1/(γ target))) is calculated from the expression (4) based on the obtained laser power Pwth and the target γ value (γ target) for the disc 100, it is apparent that the optimum laser power Pws to the disc 100 can be obtained.

Figure 3:
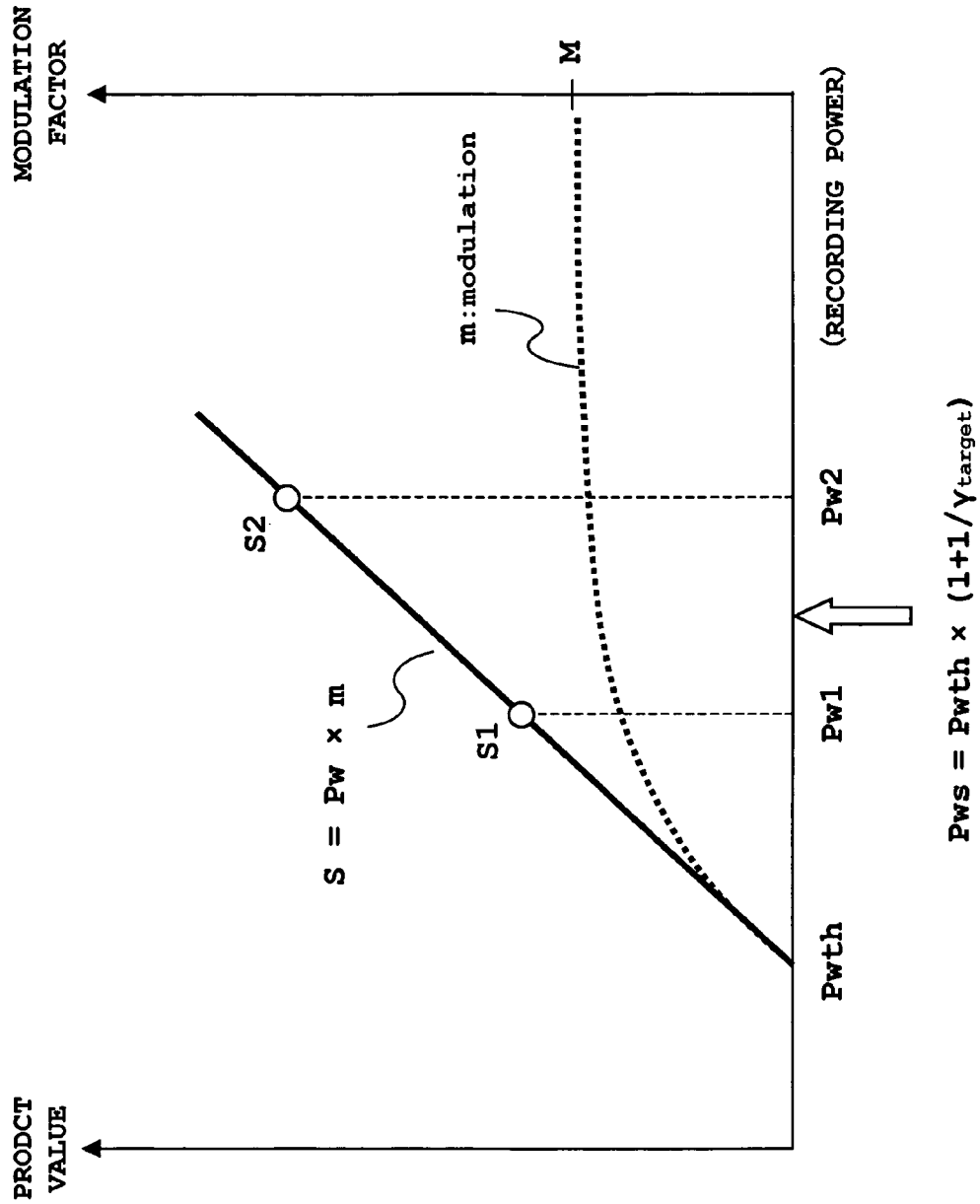
FIG. 3 is an explanatory graph showing a method of setting recording laser power according to Embodiment 1 of the present invention.

As shown in FIG. 3, for example, trail writing is performed using two kinds of recording laser powers Pw1 and Pw2 and then reproduction is performed to obtain modulation factors m(Pw1) and m(Pw2). Two kinds of product values S1 (=m(Pw1)×Pw1) and S2 (=m(Pw2)×Pw2) are calculated based on the obtained modulation factors. The calculated product values S1 and S2 are subjected to linear approximation. Therefore, the laser power Pw when an approximate line becomes zero can be obtained as Pwth. Then, when Pws is calculated from "Pws=Pwth×(1+1/(γ target))" based on the obtained laser power Pwth and the target γ value (γ target) for the medium, it is possible to obtain the optimum laser power Pws to the disc 100.

In FIG. 3, the trail writing is performed using two kinds of recording laser powers Pw1 and Pw2. When the trail writing is performed using three or more kinds of recording laser powers, the approximate precision of the approximate line S can be improved. In this case, the laser power Pwth obtained in the case of the approximate line S=0 is easy to approximate a true value. However, the number of times trial writing is performed becomes larger, so that a necessary processing time lengthens.

In this embodiment, initial setting of the recording laser power Pws is performed by the processing sequence described with reference to FIG. 3. That is, the trial writing is performed using two kinds of recording laser powers Pw1 and Pw2 on the inner disc drive zone of the read-in area or the outer disc drive zone of the read-out area and then the reproduction is performed. The approximate line S is calculated based on reproduction signals. The laser power Pwth is obtained based on the calculated approximate line S. The calculation of "Pws=Pwth×(1+1/(γ target))" is performed to set an initial value of the recording laser power Pws. As described above, the γ target is obtained from the ADIP of the read-in area at the time of inserting the disc.

Resetting of the recording laser power Pws du ring the intermittent standby period other than the recording operational period is performed as follows. A predetermined unit number of sample data are recorded in the head of the next recording position. As in the case of FIG. 3, the approximate line S is calculated based on reproduction signals obtained when the sample data are reproduced and reproduction signals obtained when several blocks recorded on the end side of a recording area immediately before the intermittent standby period are produced. The laser power Pwth is obtained based on the calculated approximate line S. The calculation of "Pws=Pwth×(1+1/ (γ target))" is performed to obtain a reset value of the recording laser power Pws.

Figure 4:
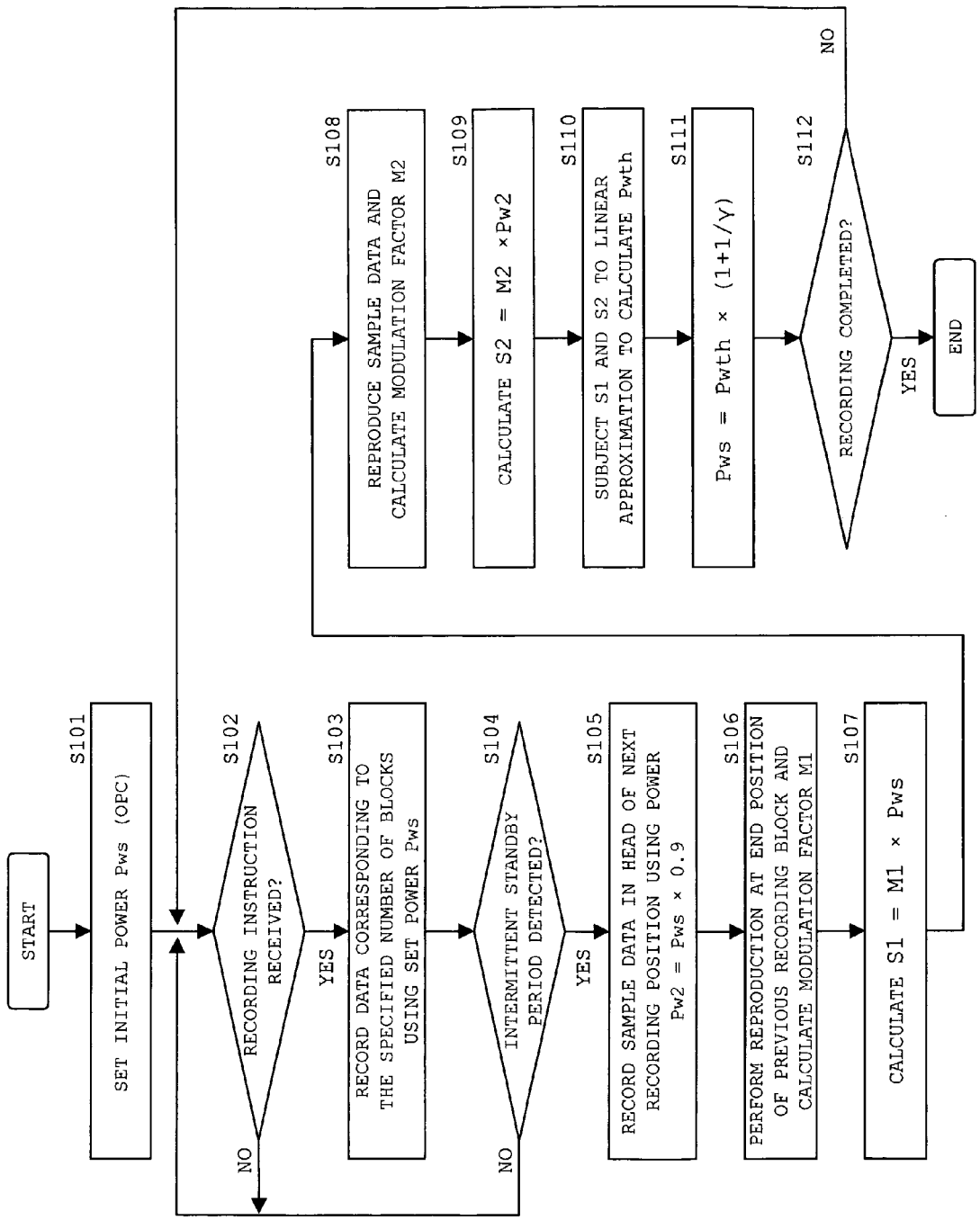
FIG. 4 is a flow chart showing processing for setting the recording laser power according to Embodiment 1 of the present invention.

FIG. 4 is a processing flow chart showing processing for setting and adjusting the recording laser power. Hereinafter, the initial setting operation of the recording laser power Pws is referred to as OPC and the resetting operation of the recording laser power Pws is referred to as R-OPC.

When a recording start instruction is inputted, the OPC is performed to set an initial value of the recording laser power Pws (Step S101). After that, when a first recording instruction is issued (Step S102: YES), the optical pickup 105 moves to a recording position and data corresponding to the specified number of blocks are recorded using the initial set value of the recording laser power Pws (Step S103).

Then, when the recording of the blocks is completed, whether or not an intermittent standby period is detected is determined. When the intermittent standby period is detected (Step S104: YES), the optical pickup 105 moves to the next recording position and sample data is recorded from the head thereof using laser power Pw2 (Pw2=Pws×0.9) obtained by reducing the current recording laser power by 10% (Step S105).

After the recording of the sample data, the optical pickup 105 moves to an end position of a recording block immediately before the intermittent standby period, that is, an end position of the recording block which is firstly recorded (position shifted backward from the end by the predetermined number of blocks) and reproduction is performed at the end position. A modulation factor m1 is calculated based on are production signal (Step S106) The product value S1 is calculated based on the calculated modulation factor m1 and the current recording laser power Pws (Step S107).

Next, the sample data recorded in Step S105 is reproduced and a modulation factor m2 is calculated based on a reproduction signal (Step S108). The product value S2 is calculated based on the calculated modulation factor m2 and the recording laser power Pw2 (Step S109).

After the product values S1 and S2 are calculated as described above, the product values S1 and S2 are subjected to linear approximation to obtain laser power Pwth as shown in FIG. 3 (Step S110). Pws (=Pwth×(1+1/γ)) is calculated based on the obtained laser power Pwth and the target γ value (γ target) for the disc 100 to set the recording laser power again (Step S111).

After the resetting of the recording laser power, unless a recording completion instruction (Step S112) is received, processing returns to Step S102 and waits for the next recording instruction. When the next recording instruction is received (Step S102: YES), the optical pickup 105 moves to the next recording position and data corresponding to the specified number of blocks is recorded using the reset recording laser power Pws (Step S103). Hereinafter, the same processings are repeated until the recording completion instruction (Step S112) is received.

Figure 5:
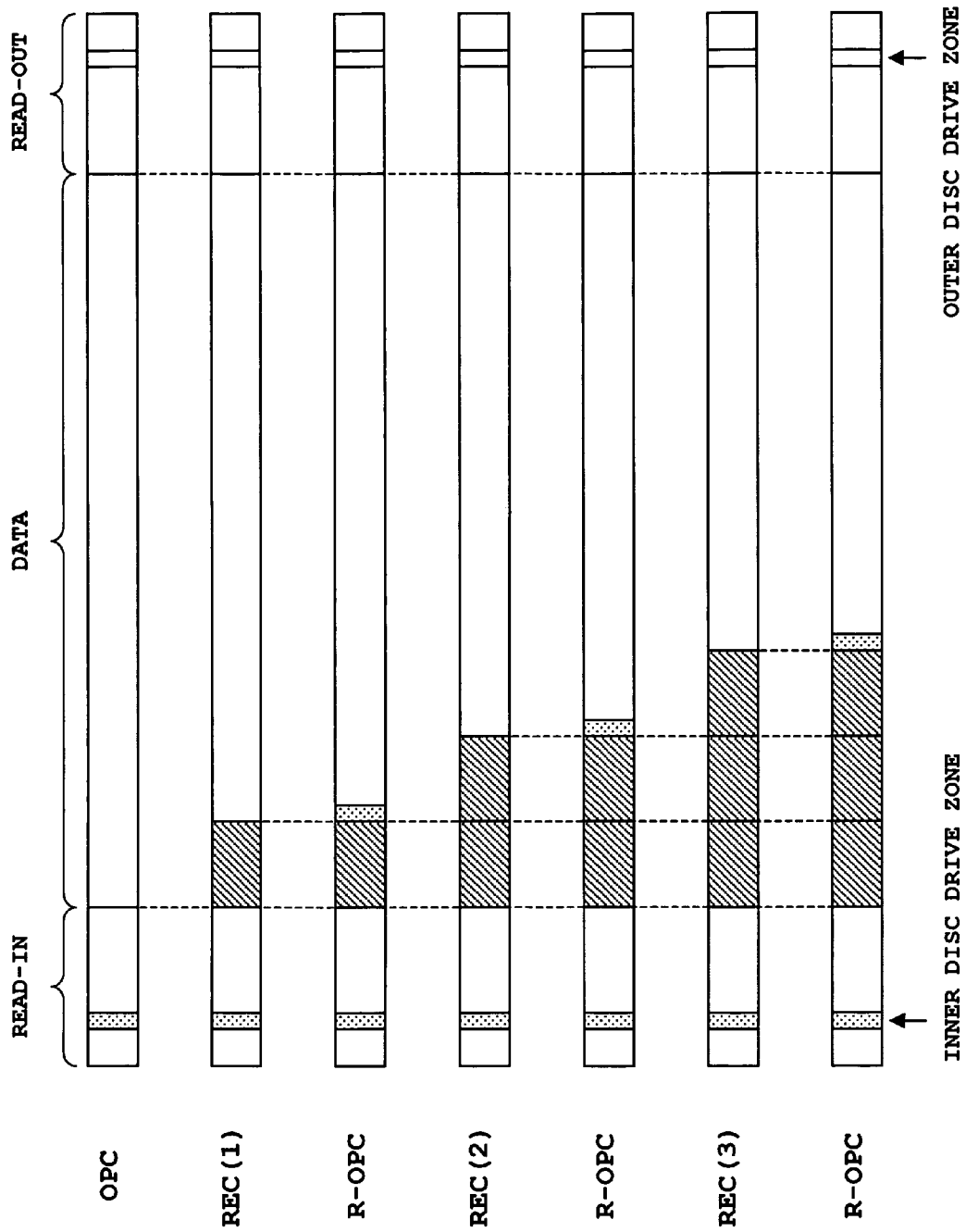
FIG. 5 is a timing chart showing recording operation according to Embodiment 1 of the present invention.

FIG. 5 is a timing chart after recording starts. Note that FIG. 5 is a timing chart at the time of recording data on a disc in which no data is recorded.

When the recording start instruction is inputted, the OPC is executed based on the inner disc drive zone of the read-in area to set the initial value of the recording laser power Pws. After that, when a first recording instruction REC(1) is issued, recording is successively performed from the head of a data area using the laser power Pws. The recording is performed until the intermittent standby period is set.

After that, when the intermittent standby period is set, sample data is recorded to the next recording position, that is, a position next to an end portion of the first recording instruction REC(1) and the R-OPC is executed. Therefore, the recording laser power Pws is set again.

Then, when a second recording instruction REC(2) is issued, recording is successively performed from the next recording position, that is, a position next to an end portion of the first recording instruction REC(1) using the reset laser power Pws. At this time, data corresponding to the head of the second recording instruction REC(2) is overwritten on sample data in a head area of the recording position.

After that, when the intermittent standby period is set, sample data is recorded to the next recording position, that is, a position next to an end portion of the second recording instruction REC(2) and the R-OPC is executed. Therefore, the recording laser power Pws is set again. Hereinafter, the recording operation and the resetting operation of the recording laser power Pws are similarly repeated.

As describe above, according to this embodiment, the recording laser power Pws is set again as appropriate using the intermittent standby period. Therefore, it is possible to dynamically adjust and change the recording laser power Pws without the complication of processing during the recording operation, so that smooth recording operation can be realized. At this time, the sample data is recorded to the next recording position to set the laser power again, with the result that the laser power reflecting a state of the next recording position can be set. The resetting is performed using previously recording data, so that the laser power is set again based on a close modulation factor in terms of time. In particular, in the case of a disc on which no data is recorded, as shown in FIG. 5, the laser power can be set again based on a modulation factor related to a position close to the next recording position. Thus, it is possible to maintain high appropriateness of the laser power.

As described above, according to this embodiment, it is possible to realize both the simplified processing and the adequate recording laser power.

Note that the sample data is recorded using the laser power obtained by reducing the current recording laser power by 10%. When the laser power Pwth can be adequately obtained based on the product values S1 and S2 as described above, it is also possible to set a reduction factor other than 10%. The reduction factor may be suitably set to an adequate value based on, for example, a result obtained by experiment. In general, the reduction factor is preferably set to about 10% to 20%.

Embodiment 2

In this embodiment, the recording laser power setting method is modified to improve appropriateness of the laser power, as compared with Embodiment 1. That is, although the recording laser power is set based on the expressions (1) to (4) in Embodiment 1, the expressions (2) to (4) are modified to set the recording laser power in this embodiment.

That is, although the linear fit method is based on the assumption that the expression (2) is established, the inventor(s) of this application have found that such an assumption does not match with an actual recording characteristic with high precision according to examination. Further, the inventor(s) of this application have found that the following expression is fit to the actual recording characteristic as compared with the expression (2).

$$m(Pw) \times Pw^2 = M \times (Pw - Pwth) \quad (5)$$

When substituting the expression (5) in the expression (1), the following expression is obtained.

$$\gamma = \{2Pwth - Pw\}/(Pw - Pwth) \quad (6)$$

When the expression (6) is solved for Pw, the optimum laser power Pws is obtained from the following expression:

$$Pws = Pwth \times \{1 + 1/(\gamma+1)\} \quad (7)$$

In this embodiment, initial setting of the recording laser power (OPC) and resetting thereof (R-OPC) are performed based on the expressions (5) and (7). That is, according to the OPC, trail writing is performed using the two kinds of recording laser powers Pw1 and Pw2 and then reproduction is performed to obtain the modulation factors m(Pw1) and m(Pw2). Two kinds of product values S1 (=m(Pw1)×Pw1$^2$) and S2 (=m(Pw2)×Pw2$^2$) are calculated based on the obtained modulation factors. The calculated product values S1 and S2 are subjected to linear approximation, so that the laser power Pw when an approximate line becomes zero can be obtained as Pwth. Then, when the laser power Pws is calculated from "Pws=Pwth×{1+1/(γ target+1)}" based on the obtained laser power Pwth and the target γ value (γ target) for the medium, the optimum laser power Pws to the disc 100 is obtained.

According to the R-OPC, a predetermined unit number of sample data are recorded in the head of the next recording position. As in the case of the OPC, the approximate line S is calculated based on reproduction signals obtained when the sample data are reproduced and reproduction signals obtained when several blocks recorded on the end side of a recording area immediately before the intermittent standby period are produced. The laser power Pwth is obtained based on the calculated approximate line S. The calculation of "Pw=Pwth×{1+1/(γ target+1)}" is performed to obtain a reset value of the recording laser power Pws.

Figure 6:
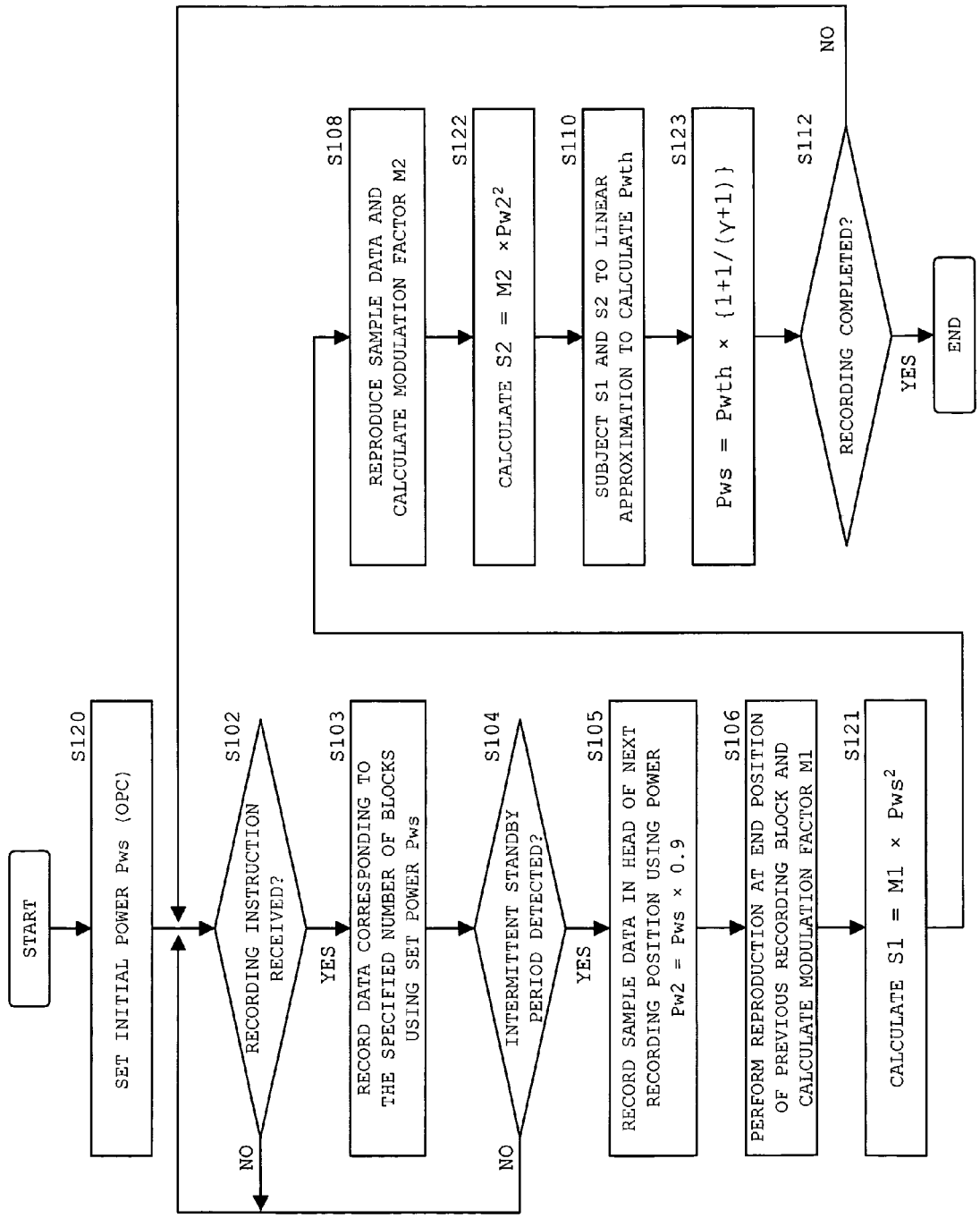
FIG. 6 is a flow chart showing processing for setting the recording laser power according to Embodiment 2 of the present invention.

FIG. 6 is a processing flow chart showing processing for setting and adjusting the recording laser power. The processing flow chart is different from the processing flow chart (FIG. 4) in Embodiment 1 with respect to processing steps (Steps S120, S121, S122, and S123) corresponding to the modifications of the above-mentioned calculation expressions. The other processing steps are identical to those in Embodiment 1.

Hereinafter, technical effects obtained when the calculation expressions are employed will be described with reference to verification examples.

VERIFICATION EXAMPLE 1

In this verification example, a DVD+RW disc produced by a manufacturer A is used as a sample disc. The modulation factor m(Pwn), the product value Sn (=m(Pwn)×Pwn) (linear fit method), and the product value Sn (=m(Pwn)×Pwn$^2$) (Embodiment 2) are measured and calculated. The optimum laser power Pw is calculated based on those results.

Figure 8:
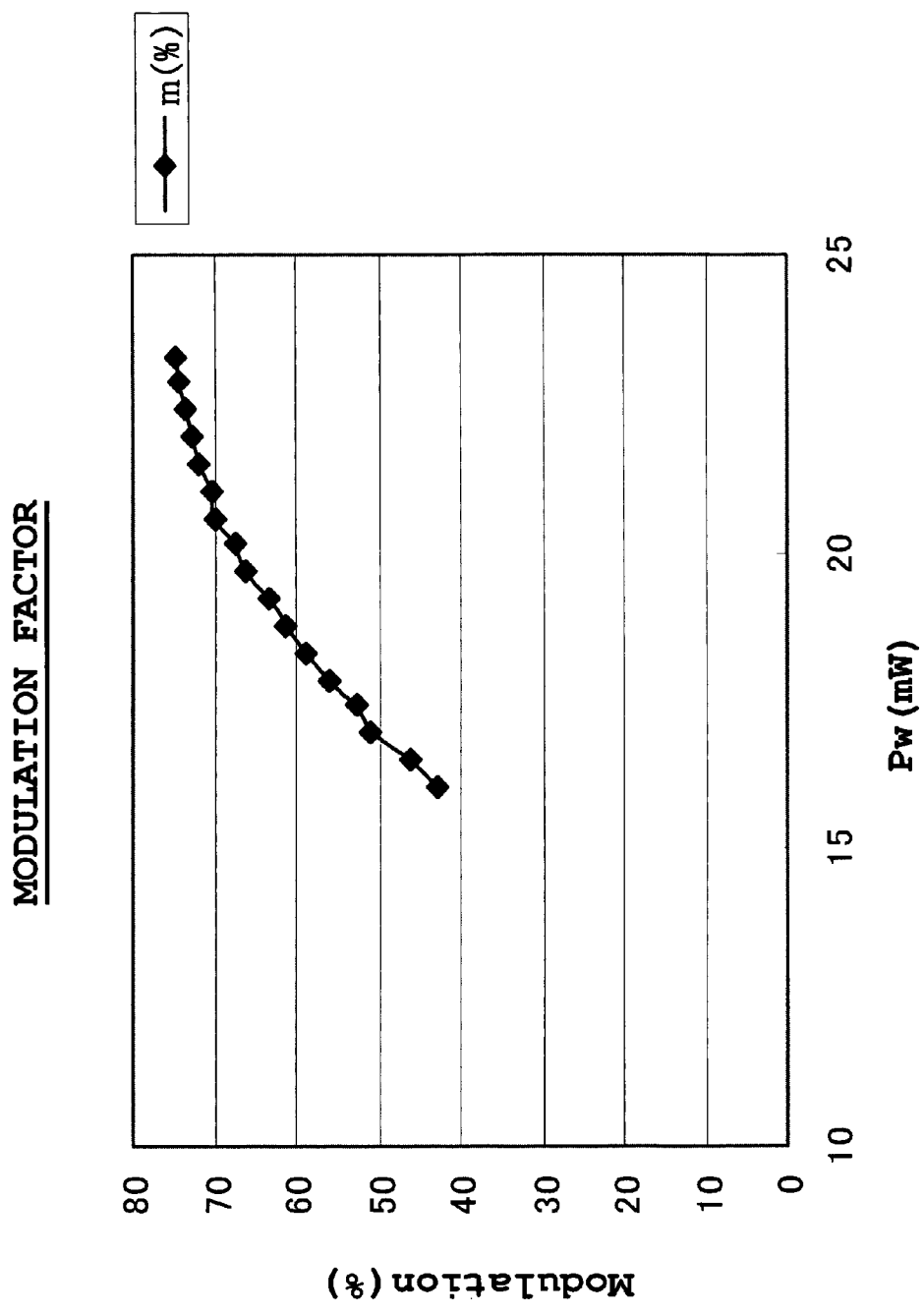
FIG. 8 is a graph explaining the technical effect according to Embodiment 2 (Verification Result 1) of the present invention.
Figure 9:
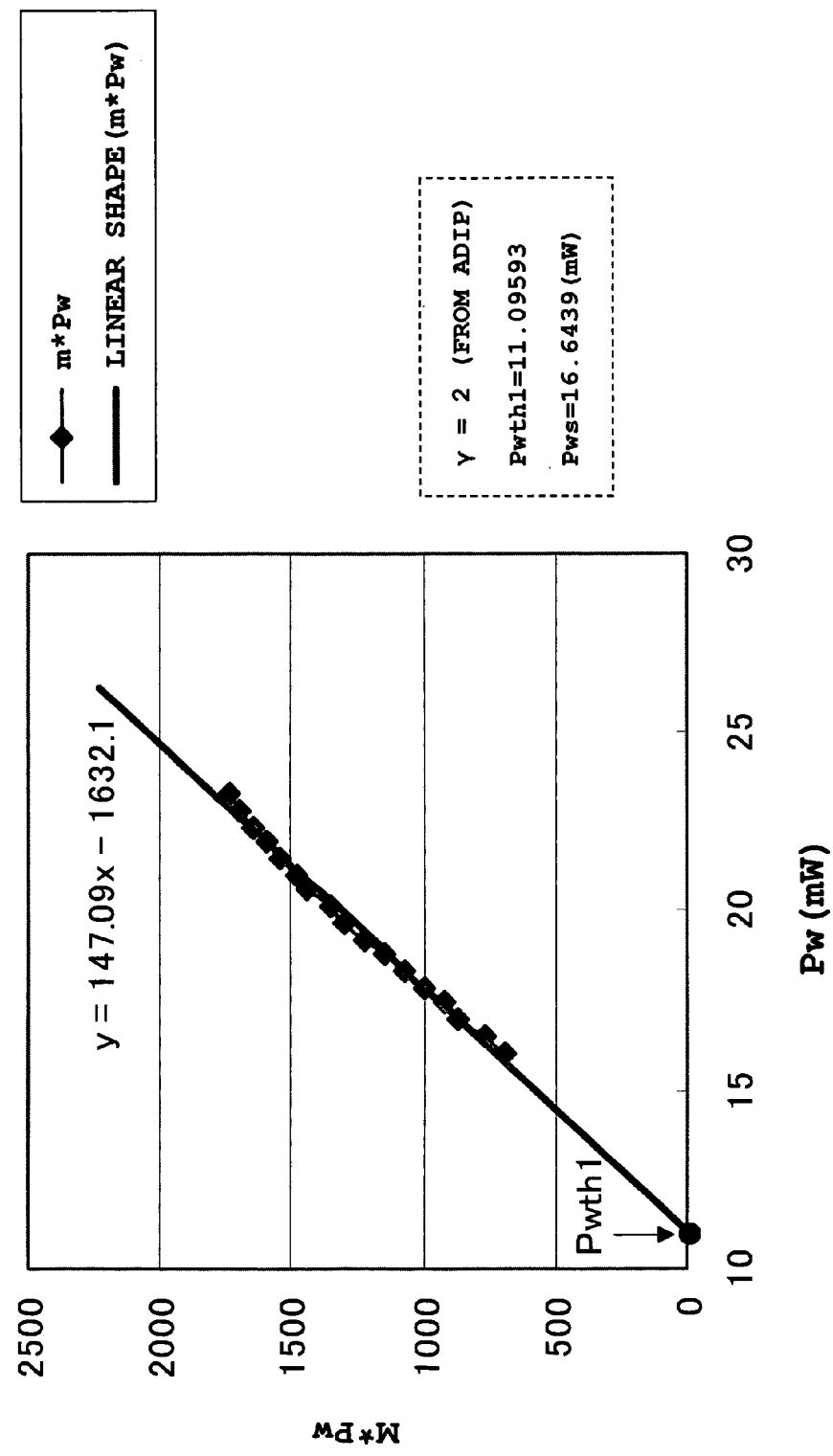
FIG. 9 is a graph explaining the technical effect according to Embodiment 2 (Verification Result 1) of the present invention.
Figure 10:
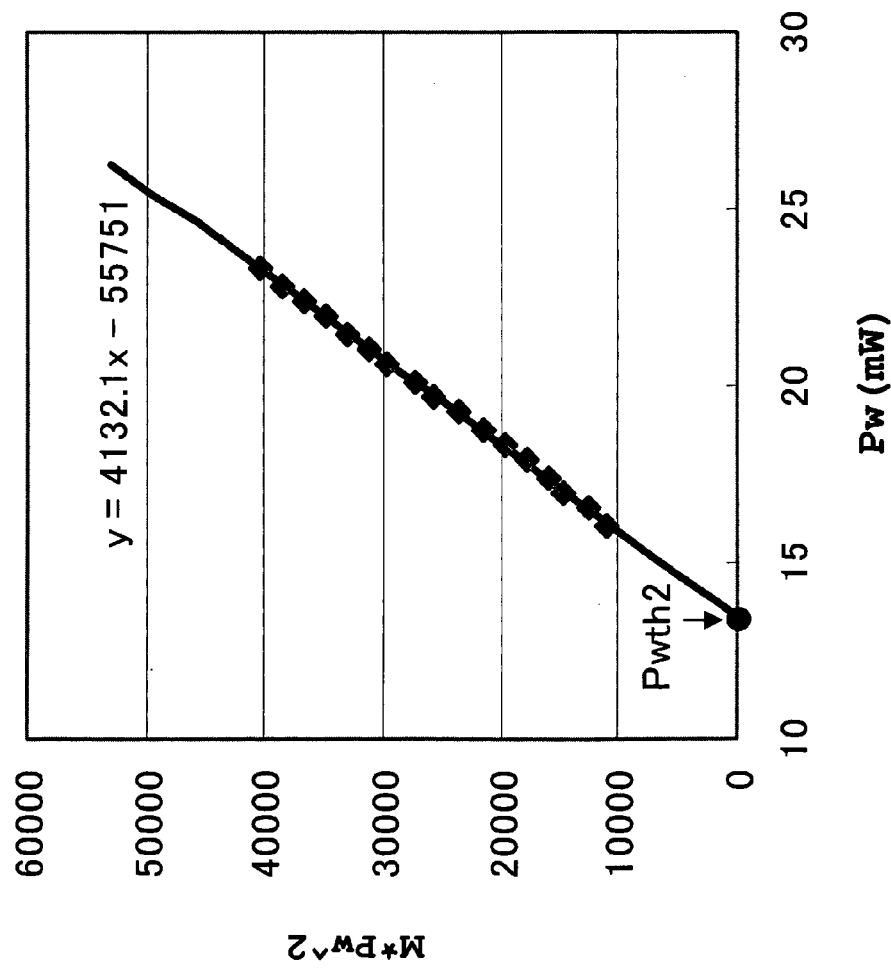
FIG. 10 is a graph explaining the technical effect according to Embodiment 2 (Verification Result 1) of the present invention.

FIG. 7 shows a numerical result obtained by the measurement and calculation in such a case. FIG. 8 is a graph showing the calculated modulation factor m(Pwn). FIG. 9 is a graph showing the calculated product value Sn (=m(Pwn)×Pwn) (Embodiment 1: linear fit method). FIG. 10 is a graph showing the calculated product value Sn (=m(Pwn)×Pwn$^2$) (Embodiment 2).

As is apparent from FIG. 9, with respect to the product value Sn (=m(Pwn)×Pwn) (linear fit method), a plot line of the product value Sn is meandered about an approximate line (y=147.09x−1632.1). Therefore, for example, the gradient of an approximate line in the case where trial writing is performed using laser power of 16 (mW) to 20 (mW) is significantly different from that in the case where trial writing is performed using laser power of 20 (mW) to 24 (mW), with the result that laser powers Pwth1 obtained in the respective cases are significantly different from each other. In other words, in the linear fit method, the laser power Pwth1 is significantly changed according to a range of laser power used for trial writing. Thus, the laser power Pw calculated based on the laser power Pwth1 is also influenced by the laser power Pwn set for trial writing.

In FIG. 9, numerical values in the lower right dotted box indicate a target γ value set for the disc (obtained from the ADIP of the disc) and the laser power Pwth1 and the optimum laser power Pws which are calculated using the linear fit method.

In contrast to this, in the laser power adjusting method according to this embodiment, as shown in FIG. 10, plots of the product value Sn are located on an approximate line (y=4132.1x−55751) with substantially no deviation. Therefore, even when trial writing is performed using the laser power of any range, the gradient of the approximate line is kept substantially constant. As a result, substantially the same laser power Pwth2 can be constantly obtained. Thus, the laser power Pw calculated based on the laser power Pwth2 also becomes substantially the same value regardless of the laser power Pwn used for trial writing.

In FIG. 10, numerical values in the lower right dotted box indicate the target γ value set for the disc (obtained from the ADIP of the disc) and the laser power Pwth2 and the optimum laser power Pws which are calculated according to the embodiment mode.

VERIFICATION EXAMPLE 2

In this verification example, a DVD+RW disc produced by a manufacturer B different from the manufacturer A is used as a sample disc. The modulation factor m(Pwn), the product value Sn (=m(Pwn)×Pwn) (linear fit method), and the product value Sn (=m(Pwn)×Pwn$^2$) (Embodiment 2) are measured and calculated. The optimum laser power Pw is calculated based on those results.

Figure 12:
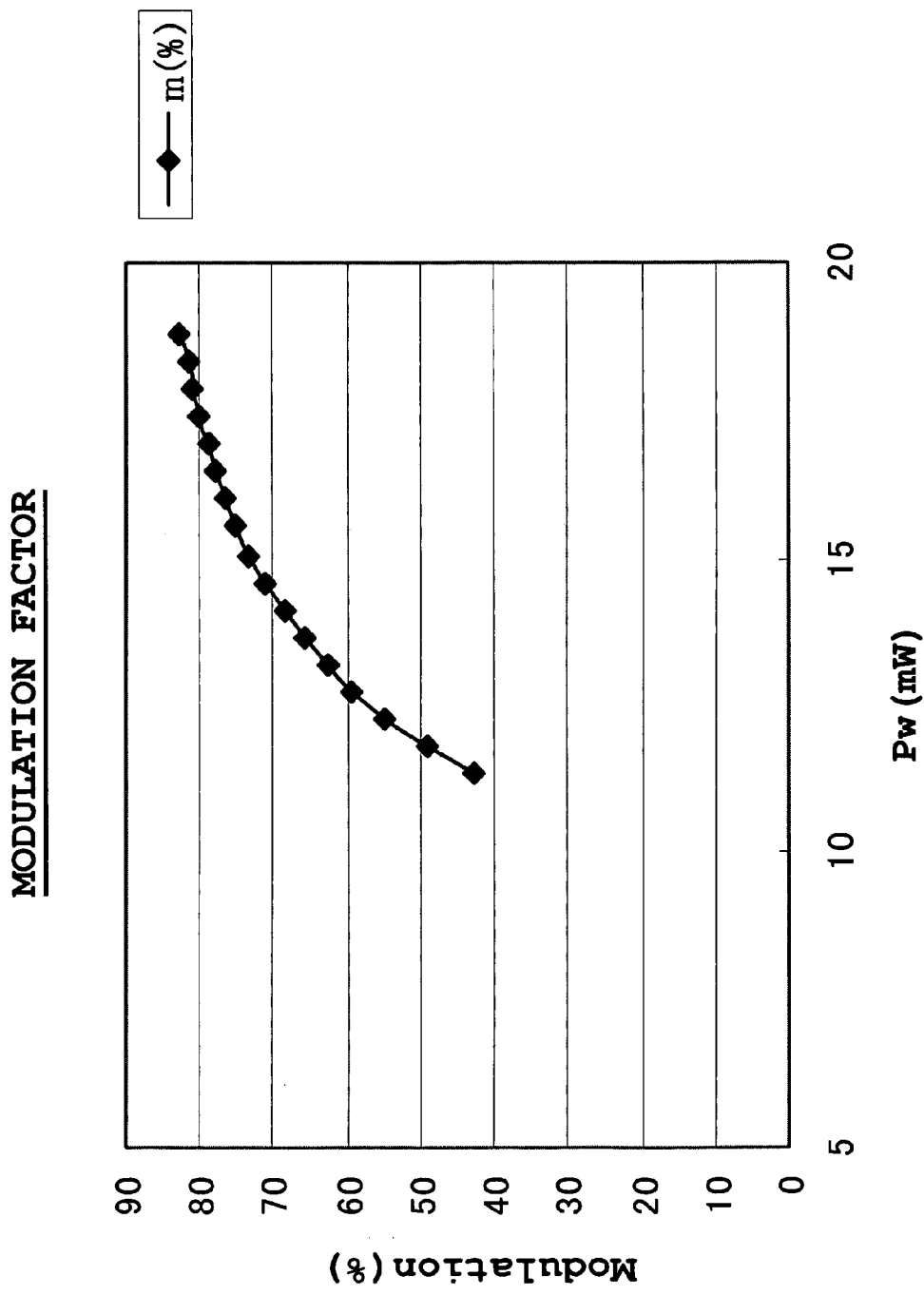
FIG. 12 is a graph explaining the technical effect according to Embodiment 2 (Verification Result 2) of the present invention.
Figure 13:
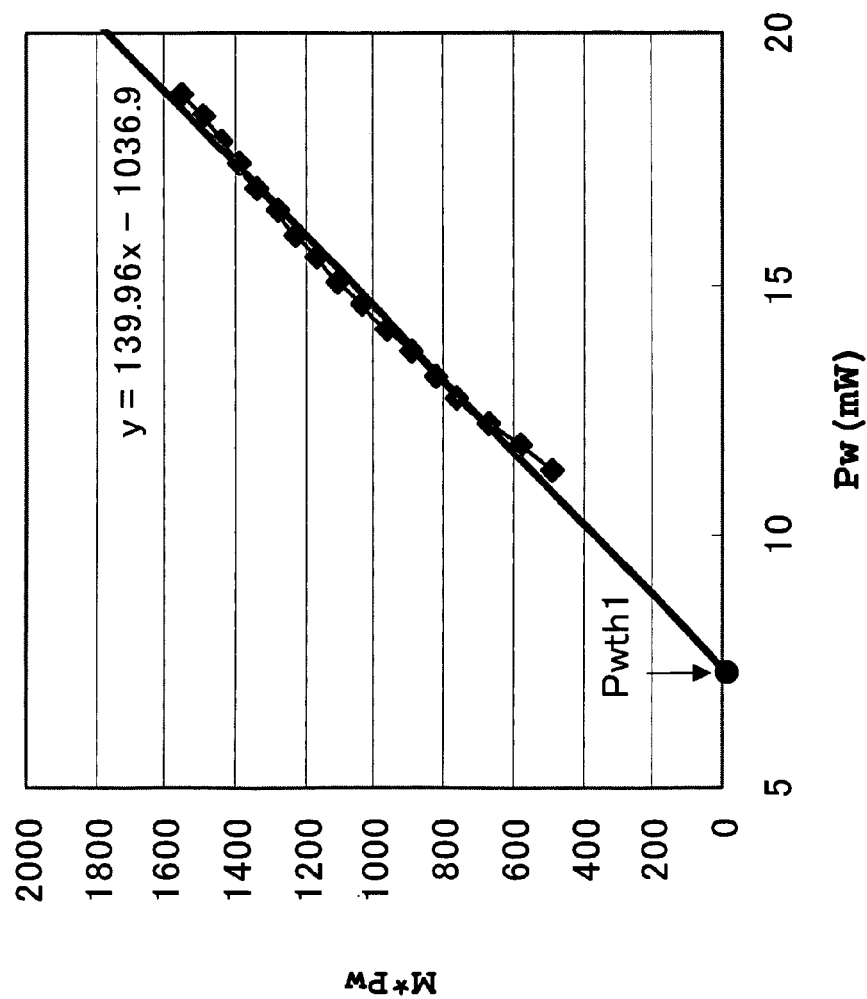
FIG. 13 is a graph explaining the technical effect according to Embodiment 2 (Verification Result 2) of the present invention.
Figure 14:
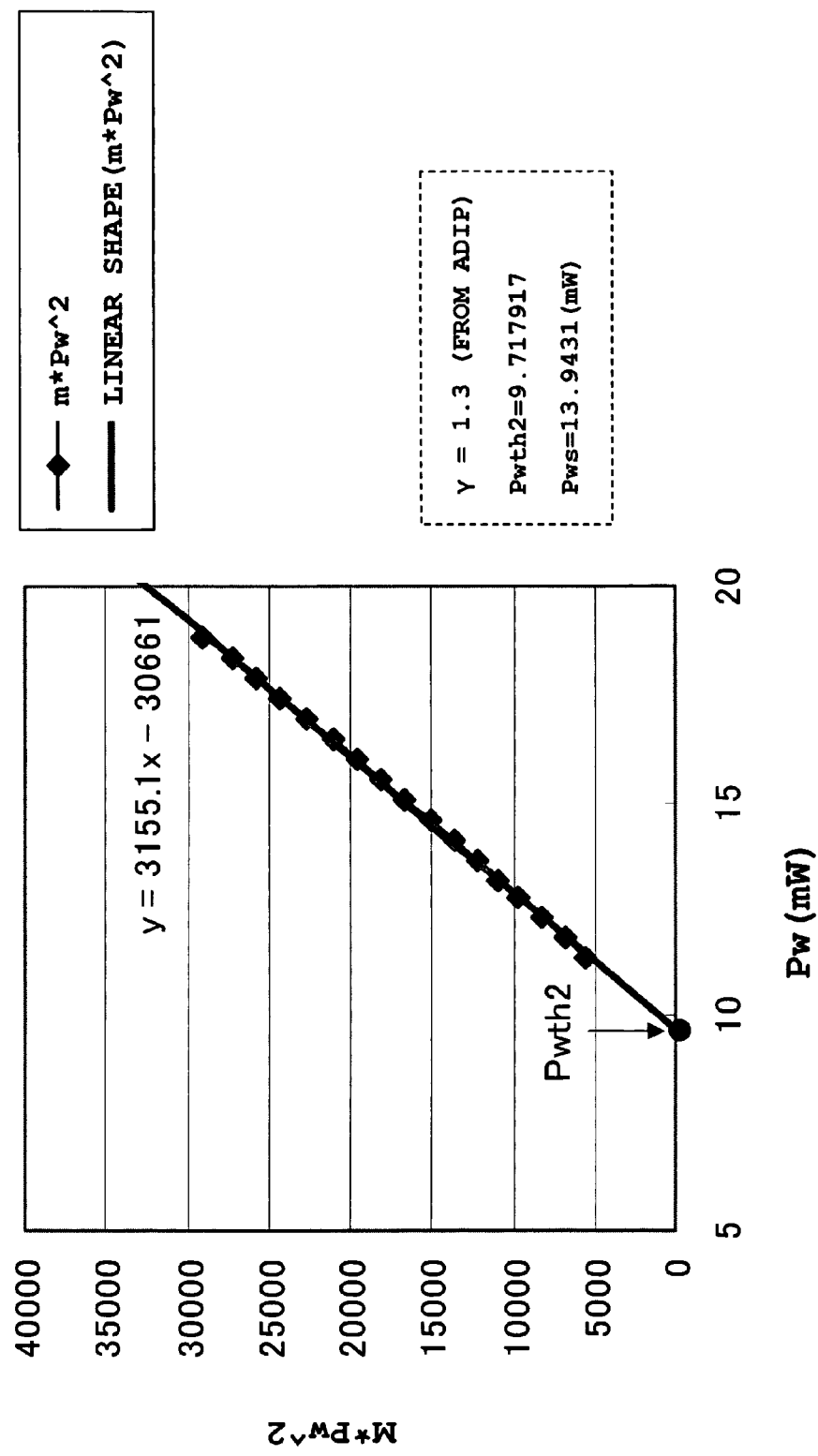
FIG. 14 is a graph explaining the technical effect according to Embodiment 2 (Verification Result 2) of the present invention.

FIG. 11 shows a numerical result obtained by the measurement and calculation in such a case. FIG. 12 is a graph showing the calculated modulation factor m(Pwn). FIG. 13 is a graph showing the calculated product value Sn (=m(Pwn)×Pwn) (Embodiment 1: linear fit method). FIG. 14 is a graph showing the calculated product value Sn (=m(Pwn)×Pwn$^2$) (Embodiment 2).

As is apparent from FIG. 13, with respect to the product value Sn (=m(Pwn)×Pwn) (linear fit method), a plot line of the product value Sn is meandered about the approximate line (y=139.96x−1036.9). Therefore, for example, the gradient of an approximate line in the case where trial writing is performed using laser power of 11 (mW) to 15 (mW) is significantly different from that in the case where trial writing is performed using laser power of 15 (mW) to 19 (mW), with the result that laser powers Pwth1 obtained in the respective cases are significantly different from each other. In other words, in the linear fit method, the laser power Pwth1 is significantly changed according to a range of laser power used for trial writing. Thus, the laser power Pws calculated based on the laser power Pwth1 is also influenced by the laser power Pwn set for trial writing.

In FIG. 13, numerical values in the lower right dotted box indicate a target γ value set for the disc (obtained from the ADIP of the disc) and the laser power Pwth1 and the optimum laser power Pws which are calculated using the linear fit method.

In contrast to this, in the laser power adjusting method according to Embodiment 2, as shown in FIG. 14, plots of the product value Sn are located on an approximate line (y=3155.1x−30661) with substantially no deviation. Therefore, even when trial writing is performed using the laser power of any range, the gradient of the approximate line is kept substantially constant. As a result, substantially the same laser power Pwth2 can be constantly obtained. Thus, the laser power Pws calculated based on the laser power Pwth2 also becomes substantially the same value regardless of the laser power Pwn used for trial writing.

In FIG. 14, numerical values in the lower right dotted box indicate the target γ value set for the disc (obtained from the ADIP of the disc) and the laser power Pwth2 and the optimum laser power Pws which are calculated according to the embodiment mode.

As described above, according to Embodiment 2, even when any laser power is set for trial writing or resetting, the optimum laser power can be smoothly set. In addition, because the plots of the product value Sn are located on the approximate line with substantially no deviation, the adequate approximate line can be obtained from only the two product values Sn as described above. Thus, it is possible to set the adequate laser power even when the number of times trial writing is performed is small.

The embodiment mode of the present invention has been described so far. The present invention is not limited to the embodiment mode and thus various other modifications can be made.

For example, in the embodiment mode, the trial writing is performed twice in the OPC. The trial writing in the opc may be performed three or more times. Note that the number of times the trial writing is performed in the R-OPC is limited in relation to the intermittent standby period. In Embodiment 2, the recording laser power Pws can be set again with relatively high precision even when the trial writing in the R-OPC is performed once. When the intermittent standby period is long, trial writing in the R-OPC may be performed two or more times using different laser powers. The number of times trial writing is performed may be changed as appropriate according to a length of the intermittent standby period.

In the embodiment mode, when the intermittent standby period starts, the R-OPC is performed. The R-OPC may be performed after recording operation is forcedly completed in accordance with the fact that one-time recording operation continues over a predetermined time. According to this, it is possible to prevent the recording laser power Pws from being maintained for a long period. Thus, smooth recording operation can be realized. When the recording operation is forcedly completed as described above, it is preferable to promptly return to the recording operation upon the completion of resetting of laser power.

In the embodiment mode, the R-OPC is performed every time the intermittent standby period starts. A predetermined rule may be provided for a relationship between the start of the intermittent standby period and the execution of the R-OPC. For example, even when the next intermittent standby period starts, the R-OPC is not performed until a predetermined time elapses from the time of execution of the previous R-OPC.

Furthermore, the embodiments of the present invention allow various changes and modifications as appropriate within the scope of the technical idea of the present invention as set forth in the appended claims.

What is claimed is:

1. An optical disc device for recording and reproducing information on and from a rewritable disc, comprising:
   sample data recording means for recording sample data using recording laser power different from current laser power during an intermittent standby period other than a recording operational period;
   sample data reproducing means for reproducing the sample data recorded by the sample data recording means during the intermittent standby period;
   recorded data reproducing means for reproducing data recorded by recording operation performed before the intermittent standby period, during the intermittent standby period; and
   power correcting means for obtaining a current recording characteristic from a reproduction signal reproduced by the sample data reproducing means and a reproduction signal reproduced by the recorded data reproducing means and correcting the recording laser power based on the obtained current recording characteristic.

2. An optical disc device according to claim 1, wherein the sample data recording means records the sample data using laser power obtained by reducing the current laser power by a predetermined factor.

3. An optical disc device according to claim 1, wherein the sample data recording means records the sample data in a next recording position after a lapse of the intermittent standby period.

4. An optical disc device according to claim 3, wherein data recorded after a lapse of the intermittent standby period is overwritten on the sample data from a next recording position after the lapse of the intermittent standby period.

5. An optical disc device according to claim 1, wherein the recorded data reproducing means reproduces data in a data block which is recorded immediately before the intermittent standby period.

6. An optical disc device according to claim 5, wherein the recorded data reproducing means reproduces a predetermined amount of data from an end portion of the data block which is recorded immediately before the intermittent standby period.

7. An optical disc device according to claim 1, wherein the power correcting means obtains an approximate characteristic specifying a relationship between a predetermined parameter related to a recording characteristic and recording laser power from the reproduction signal reproduced by the sample data reproducing means and the reproduction signal reproduced by the recorded data reproducing means and resets the recording laser power based on the obtained approximate characteristic.

8. An optical disc device according to claim 7, wherein:
the predetermined parameter comprises a product of a modulation factor of a reproduction signal and recording laser power; and
the power correcting means obtains an approximate characteristic specifying a relationship between the product and recording laser power and resets the recording laser power based on the obtained approximate characteristic and a $\gamma$ value required for the rewritable disc.

9. An optical disc device according to claim 7, wherein:
the predetermined parameter comprises a product of a modulation factor of a reproduction signal and a square of recording laser power; and
the power correcting means obtains an approximate characteristic specifying a relationship between the product and recording laser power and resets the recording laser power based on the obtained approximate characteristic and a $\gamma$ value required for the rewritable disc.

10. An optical disc device for recording and reproducing information on and from are writable disc, comprising a controller, the controller performing:
control processing for recording sample data using recording laser power different from current laser power during an intermittent standby period other than a recording operational period;
control processing for reading the sample data recorded during the intermittent standby period;
control processing for reading recorded data recorded by recording operation performed before the intermittent standby period, during the intermittent standby period; and
control processing for obtaining a current recording characteristic from a reproduction signal obtained by reading the sample data and a reproduction signal obtained by reading the recorded data and correcting the recording laser power based on the obtained current recording characteristic.

11. An optical disc device according to claim 10, wherein the control processing for recording the sample data, which is performed by the controller, comprises control processing for recording the sample data using laser power obtained by reducing the current laser power by a predetermined factor.

12. An optical disc device according to claim 10, wherein the control processing for recording the sample data, which is performed by the controller, comprises control processing for recording the sample data in a next recording position after a lapse of the intermittent standby period.

13. An optical disc device according to claim 10, wherein the control processing for reading the recorded data, which is performed by the controller, comprises control processing for reading data in a data block which is recorded immediately before the intermittent standby period.

14. An optical disc device according to claim 13, wherein the control processing for reading the recorded data, which is performed by the controller, comprises control processing for reading a predetermined amount of data from an end portion of the data block which is recorded immediately before the intermittent standby period.

15. An optical disc device according to claim 10, wherein the control processing for correcting the recording laser power, which is performed by the controller, comprises control processing for obtaining an approximate characteristic specifying a relationship between a predetermined parameter related to a recording characteristic and recording laser power from the reproduction signal obtained by reading the sample data and the reproduction signal obtained by reading the recorded data and resetting the recording laser power based on the obtained approximate characteristic.

16. An optical disc device according to claim 15, wherein:
the predetermined parameter comprises a product of a modulation factor of a reproduction signal and recording laser power; and
the control processing for correcting the recording laser power, which is performed by the controller, comprises control processing for obtaining an approximate characteristic specifying a relationship between the product and recording laser power and resetting the recording laser power based on the obtained approximate characteristic and a $\gamma$ value required for the rewritable disc.

17. An optical disc device according to claim 15, wherein:
the predetermined parameter comprises a product of a modulation factor of a reproduction signal and a square of recording laser power; and
the control processing for correcting the recording laser power, which is performed by the controller, comprises control processing for obtaining an approximate characteristic specifying a relationship between the product and recording laser power and resetting the recording laser power based on the obtained approximate characteristic and a $\gamma$ value required for the rewritable disc.

* * * * *